(12) United States Patent
Lee et al.

(10) Patent No.: US 10,240,384 B2
(45) Date of Patent: Mar. 26, 2019

(54) APPARATUS AND METHOD OF CONTROLLING TAILGATE USING REAR-VIEW CAMERA IN VEHICLE

(71) Applicant: Hyundai Motor Company, Seoul (KR)

(72) Inventors: Don Hyoung Lee, Gyeonggi-do (KR); Gi Won Park, Incheon (KR); Ji Won Kwon, Gyeonggi-do (KR); Jong Il Yu, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 131 days.

(21) Appl. No.: 15/200,595

(22) Filed: Jul. 1, 2016

(65) Prior Publication Data
US 2017/0167178 A1    Jun. 15, 2017

(30) Foreign Application Priority Data

Dec. 10, 2015 (KR) .......................... 10-2015-0175753

(51) Int. Cl.
| | | |
|---|---|---|
| *E05F 15/00* | (2015.01) | |
| *E05F 15/73* | (2015.01) | |
| *E05F 1/00* | (2006.01) | |
| *B60J 5/10* | (2006.01) | |

(52) U.S. Cl.
CPC ............... *E05F 15/73* (2015.01); *B60J 5/101* (2013.01); *E05F 1/002* (2013.01); *E05F 2015/767* (2015.01); *E05Y 2900/546* (2013.01)

(58) Field of Classification Search
None
See application file for complete search history.

(56) References Cited

U.S. PATENT DOCUMENTS

| | | | | |
|---|---|---|---|---|
| 4,833,469 | A * | 5/1989 | David ................ | B60K 31/0008 180/169 |
| 6,285,778 | B1 * | 9/2001 | Nakajima ............ | G05D 1/0248 180/167 |
| 7,528,703 | B2 * | 5/2009 | Touge ...................... | B60Q 9/00 340/425.5 |
| 8,254,632 | B2 * | 8/2012 | Heinrich ................ | B60Q 1/143 340/937 |
| 9,068,390 | B2 * | 6/2015 | Ihlenburg ................ | E05F 15/73 |
| 9,171,217 | B2 * | 10/2015 | Pawlicki ................... | G06T 7/13 |

(Continued)

FOREIGN PATENT DOCUMENTS

| | | |
|---|---|---|
| JP | 2013-117134 A | 6/2013 |
| JP | 2014-530309 A | 11/2014 |

(Continued)

*Primary Examiner* — Rami Khatib
(74) *Attorney, Agent, or Firm* — Mintz Levin Cohn Ferris Glovsky and Popeo, P.C.; Peter F. Corless

(57) ABSTRACT

A method of controlling a tailgate using a rear-view camera in a vehicle includes: supplying power to an electric device or an accessory of the vehicle, switching the rear-view camera to a switch mode if the vehicle is in a predetermined state, confirming whether or not brightness of an image captured by the rear-view camera becomes lower than a predetermined range for a predetermined time, confirming a change of brightness of the image using at least one tail lamp or another lamp installed adjacent to the rear-view camera if the brightness of the image becomes lower than the predetermined range for the predetermined time, and opening the tailgate if there is no change of brightness of the image.

20 Claims, 8 Drawing Sheets

(56) References Cited

U.S. PATENT DOCUMENTS

| | | | |
|---|---|---|---|
| 9,269,263 B2* | 2/2016 | Gieseke | G08G 1/04 |
| 9,436,880 B2* | 9/2016 | Bos | B60N 2/002 |
| 2001/0042989 A1* | 11/2001 | Greif | B60J 5/101 |
| | | | 296/50 |
| 2002/0074959 A1* | 6/2002 | Van Wiemeersch | |
| | | | G07C 9/00182 |
| | | | 318/445 |
| 2002/0084675 A1* | 7/2002 | Buchanan, Jr. | B60J 5/101 |
| | | | 296/146.8 |
| 2003/0052969 A1* | 3/2003 | Satoh | B60R 1/00 |
| | | | 348/148 |
| 2004/0200149 A1* | 10/2004 | Dickmann | G01S 7/4817 |
| | | | 49/26 |
| 2005/0085972 A1* | 4/2005 | Martinez | E05C 17/00 |
| | | | 701/49 |
| 2005/0163383 A1* | 7/2005 | Kim | G06K 9/00597 |
| | | | 382/209 |
| 2005/0174077 A1* | 8/2005 | Haag | G01S 13/04 |
| | | | 318/280 |
| 2005/0242618 A1* | 11/2005 | Menard | E05F 15/43 |
| | | | 296/146.4 |
| 2007/0296242 A1* | 12/2007 | Frommer | E05F 15/43 |
| | | | 296/146.4 |
| 2008/0199051 A1* | 8/2008 | Seo | G08B 13/19602 |
| | | | 382/107 |
| 2008/0291000 A1* | 11/2008 | Kim | B60Q 9/008 |
| | | | 340/436 |
| 2008/0294314 A1* | 11/2008 | Morris | E05F 5/00 |
| | | | 701/49 |
| 2009/0000196 A1* | 1/2009 | Kollar | E05F 15/43 |
| | | | 49/28 |
| 2009/0260289 A1* | 10/2009 | Carpenter | E05F 5/00 |
| | | | 49/26 |
| 2009/0309710 A1* | 12/2009 | Kakinami | B60Q 9/004 |
| | | | 340/435 |
| 2010/0076651 A1* | 3/2010 | Nakakura | E05C 17/00 |
| | | | 701/49 |
| 2011/0043633 A1* | 2/2011 | Sarioglu | G01S 5/16 |
| | | | 348/148 |
| 2011/0196568 A1* | 8/2011 | Nickolaou | B60W 30/0953 |
| | | | 701/31.4 |
| 2011/0215916 A1* | 9/2011 | Boehme | E05F 15/43 |
| | | | 340/436 |
| 2011/0267467 A1* | 11/2011 | Kimura | G01J 3/50 |
| | | | 348/148 |
| 2014/0039766 A1* | 2/2014 | Miyake | B60R 25/245 |
| | | | 701/49 |
| 2014/0168415 A1* | 6/2014 | Ihlenburg | B60R 11/04 |
| | | | 348/118 |
| 2014/0207344 A1* | 7/2014 | Ihlenburg | E05F 15/73 |
| | | | 701/49 |
| 2014/0218529 A1* | 8/2014 | Mahmoud | H04N 7/181 |
| | | | 348/148 |
| 2014/0379218 A1* | 12/2014 | Foltin | B60Q 1/085 |
| | | | 701/41 |
| 2015/0300073 A1* | 10/2015 | Ihlenburg | E05F 15/73 |
| | | | 701/49 |
| 2017/0197807 A1* | 7/2017 | Noda | G06K 9/00335 |

FOREIGN PATENT DOCUMENTS

| | | |
|---|---|---|
| KR | 10-0887688 B1 | 3/2009 |
| KR | 2014-0076428 A | 6/2014 |
| KR | 2014-0083278 A | 7/2014 |
| KR | 2014-0083384 A | 7/2014 |
| KR | 2015-0072166 A | 6/2015 |
| KR | 10-2015-0097040 A | 8/2015 |
| WO | 2013/037465 A1 | 3/2013 |

* cited by examiner

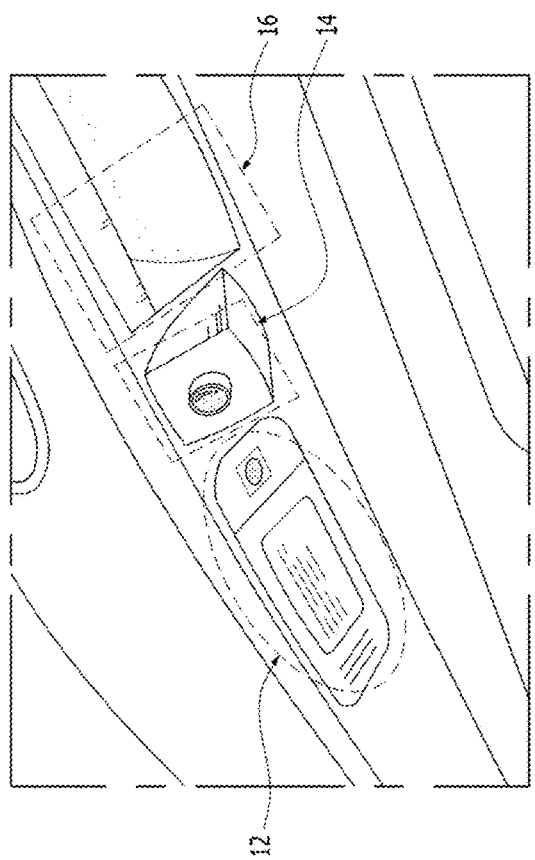
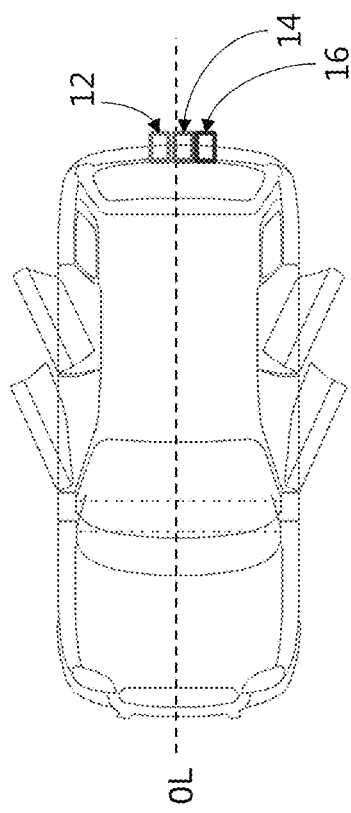
FIG.1(b)
FIG.1(a)

APPARATUS AND METHOD OF CONTROLLING TAILGATE USING REAR-VIEW CAMERA IN VEHICLE

CROSS-REFERENCE TO RELATED APPLICATION

This application claims under 35 U.S.C. § 119(a) the benefit of Korean Patent Application No. 10-2015-0175753, filed on Dec. 10, 2015, the entire contents of which are incorporated by reference herein.

BACKGROUND (a) Field of the Invention

The present invention relates to an apparatus and method of controlling a tailgate using a rear-view camera in a vehicle, and more particularly, to an apparatus and method for allowing the tailgate to be opened using the rear-view camera without a separate switch (gate or lever) for controlling the tailgate.

(b) Description of the Related Art

In general, a vehicle includes a trunk, i.e., a space which may be loaded with articles to be transported. For example, the trunk may be loaded with various sizes of equipment and gear for leisure time activities, as well as an umbrella, emergency articles, heavy loads, etc., for use in daily life.

A rear door of a vehicle, i.e., a door to open and close a trunk, is referred to as a tailgate. Recently, methods of more easily and conveniently controlling a tailgate when cargo is loaded on or unloaded from a trunk have been proposed. For example, an apparatus which may allow a user to open a tailgate with his/her foot instead of his/her hands if the user holds a heavy load with both hands has been provided for convenience. Further, a power tailgate which may be automatically opened and closed through a button provided in the inner surface of a vehicle has been implemented in certain vehicles.

Even in the case of the above-described examples, a separate switch may still be provided on a rear door of a vehicle for controlling a tailgate to open and close a trunk of the vehicle. Such a switch (e.g., an external switch) serves to manually open and close the tailgate without use of a button (or a switch) in the vehicle. In general, the switch for the tailgate is located together with a lamp for illuminating a license plate, a rear-view camera, etc. Thereamong, the license plate illuminating lamp and the rear-view camera desirably are located close to the center of the vehicle. However, due to space occupied by the switch for the tailgate, it is difficult for the license plate illuminating lamp and the rear-view camera to be located at the center of the vehicle. Therefore, measures to prevent increase in manufacturing costs of the vehicle and to eliminate functional inconvenience even if the license plate illuminating lamp and the rear-view camera are not located at the center of the vehicle are required.

SUMMARY

Accordingly, the present invention is directed to an apparatus and method of controlling a tailgate using a rear-view camera in a vehicle that substantially obviate one or more problems due to limitations and disadvantages of the related art.

An object of the present invention is to provide an apparatus and method in which a rear-view camera functions as a switch for controlling a tailgate (a rear door or a trunk door) of a vehicle and thus a separate tailgate switch may be eliminated.

Another object of the present invention is to provide an apparatus and method in which a tailgate switch may be eliminated and thus a rear-view camera in a vehicle may be located at the center of the vehicle so as to have improved performance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a tailgate using a rear-view camera in a vehicle includes steps of: supplying power to an electric device or an accessory of the vehicle, switching the rear-view camera to a switch mode if the vehicle is in a predetermined state, confirming whether or not brightness of an image captured by the rear-view camera becomes lower than a predetermined range for a predetermined time, confirming a change of brightness of the image using at least one tail lamp or another lamp installed adjacent to the rear-view camera if the brightness of the image becomes lower than the predetermined range for the predetermined time, and opening the tailgate if there is no change of brightness of the image.

The method may further include confirming whether or not a transmission of the vehicle is in a parking mode and confirming a driving speed of the vehicle if the transmission is not in the parking mode.

The predetermined state may include a case in which the transmission is in the parking mode or a case in which, if the transmission is not in the parking mode, the speed of the vehicle is zero.

A state in which the brightness of the image becomes lower than the predetermined range for the predetermined time may include a case in which the brightness of the image is lowered due to an object located in front of the rear-view camera.

Confirmation of the change of brightness of the image using the tail lamps may include confirming whether or not the tail lamps are turned on, turning off the tail lamps for a first time if the tail lamps are turned on, turning on the tail lamps for a second time, and comparing a brightness of the image for the second time to a brightness of the image before the second time.

The method may further include, if it is confirmed that there is the change of brightness of the image, continuing to close the tailgate.

The change of brightness of the image may be judged based on a brightness value (B) in an HSV color space or judged based on a brightness value (µ) in an RGB color space.

The rear-view camera may be located at the center of the vehicle.

The rear-view camera may be located between two tail lamps.

An apparatus is for controlling a tailgate using a rear-view camera in a vehicle comprising a processing system that comprises at least one data processor and at least one computer-readable memory storing a computer program.

Herein, the processing system is configured to cause the apparatus to supply power to an electric device or an accessory of a vehicle; switch a rear-view camera to a switch mode if the vehicle is in a predetermined state; confirm whether or not brightness of an image captured by the rear-view camera becomes lower than a predetermined range for a predetermined time; confirm a change of brightness of the image using at least one tail lamp or another lamp installed adjacent to the rear-view camera if the brightness of the image becomes lower than the predetermined range for the predetermined time; and open a tailgate if there is no change of brightness of the image.

In another aspect of the present invention, a non-transitory computer readable medium containing program instructions executed by a processor includes: program instructions that supply power to an electric device or an accessory of a vehicle, program instructions that switch a rear-view camera to a switch mode if the vehicle is in a predetermined state, program instructions that confirm whether or not brightness of an image captured by the rear-view camera becomes lower than a predetermined range for a predetermined time, program instructions that confirm a change of brightness of the image using at least one tail lamp or another lamp installed adjacent to the rear-view camera if the brightness of the image becomes lower than the predetermined range for the predetermined time, and program instructions that open the tailgate if there is no change of brightness of the image.

In yet another aspect of the present invention, an apparatus of controlling a tailgate using a rear-view camera in a vehicle includes a vehicle state sensing unit configured to judge whether or not the vehicle is in a predetermined state, a setting unit configured to switch the rear-view camera to a switch mode according to a result of judgment by the vehicle state sensing unit, a screen change sensing unit configured to sense change of brightness of an image captured by the rear-view camera, a controller configured to confirm whether or not brightness of the image becomes lower than a predetermined range for a predetermined time and to confirm a change of brightness of the image using at least one tail lamp or another lamp installed adjacent to the rear-view camera if the brightness of the image becomes lower than the predetermined range for the predetermined time, and a switching unit configured to generate a tailgate opening signal corresponding to output from the controller.

The rear-view camera may output an image acquired by photographing the rear surface of the vehicle and be located at the center of the vehicle.

The tail lamps may illuminate a license plate of the vehicle and be located at both sides of the rear-view camera.

The vehicle state sensing unit may confirm whether or not a transmission of the vehicle is in a parking mode and confirm a driving speed of the vehicle if the transmission is not in the parking mode.

The predetermined state may include a case in which the transmission is in the parking mode or a case in which, if the transmission is not in the parking mode, the speed of the vehicle is zero.

A state in which the brightness of the image becomes lower than the predetermined range for the predetermined time may include a case in which the brightness of the image is lowered due to an object located in front of the rear-view camera.

The controller may confirm whether or not the tail lamps are turned on through the vehicle state sensing unit, turn off the tail lamps for a first time if the tail lamps are turned on, turns on the tail lamps for a second time, and compare a brightness of the image for the second time to a brightness of the image before the second time, transmitted through the screen change sensing unit.

If it is confirmed that there is the change of brightness of the image, the controller may control the switch unit not to output the tailgate opening signal.

The screen change sensing unit may judge change of the brightness of the image based on a brightness value (B) in an HSV color space or based on a brightness value ($\mu$) in an RGB color space.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

The patent or application file contains at least one drawing executed in color. Copies of this patent or patent application publication with color drawing(s) will be provided by the Office upon request and payment of the necessary fee.

FIGS. 1(a) and 1(b) are views illustrating drawbacks caused by a conventional tailgate switch mounted in a vehicle;

DETAILED DESCRIPTION OF THE INVENTION

Figure 2:
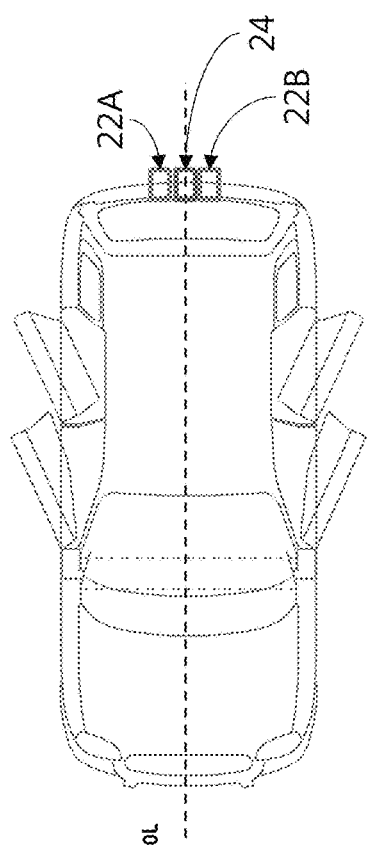
FIG. 2 is a view illustrating a vehicle from which tailgate switch is eliminated.

In the description of the invention, certain detailed explanations of related art are omitted when it is deemed that they may unnecessarily obscure the essence of the invention. The features of the invention will be more clearly understood from the accompanying drawings and should not be limited by the accompanying drawings. It is to be appreciated that all changes, equivalents, and substitutes that do not depart from the spirit and technical scope of the invention are encompassed in the invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

FIGS. 1(a) and 1(b) are views illustrating drawbacks caused by a conventional tailgate switch mounted in a vehicle. For example, FIG. 1(a) illustrates the position of the tailgate switch in the vehicle, and FIG. 1(b) illustrates a tailgate (a trunk door) on which the tailgate switch, a rear-view camera and a tail lamp are mounted.

As exemplarily shown in FIGS. 1(a) and 1(b), a rear-view camera 14, a tailgate switch 16, and a tail lamp 12 for illuminating a license plate are installed on the tailgate. Particularly, the rear-view camera 14 is not located at a central line OL of the vehicle due to the tailgate switch 16 and the tail lamp 12, and instead may be positioned to the left or right side of the vehicle.

When the rear-view camera 14 is located at the central line OL of the vehicle, the rear-view camera 14 may provide more accurate information regarding the rear surface of the vehicle to a driver (or a user). However, when the rear-view camera 14 is not located at the central line OL of the vehicle, information regarding the rear surface of the vehicle needs to be provided to the driver (or the user) via a screen correction process.

Further, although the position of the tail lamp 12 may be varied according to the position of the license plate attached to the vehicle, the license plate is generally located at the central line OL of the vehicle and thus the tail lamp 12 is also located at the central line OL of the vehicle. If the tail lamp 12 is not located at the central line OL of the vehicle even though the license plate is located at the central line OL of the vehicle, the direction of light output from the tail lamp 12 needs to be adjusted.

FIG. 2 is a view illustrating a vehicle from which a tailgate switch is eliminated.

As exemplarily shown in FIG. 2, if a rear-view camera 24 functions as a tailgate switch, the tailgate switch may be eliminated from a tailgate of the vehicle, the rear-view camera 24 may be located at the central line OL of the vehicle, and tail lamps 22A and 22B may be installed at both sides of the rear-view camera 24. In such a configuration, the rear-view camera 24 may be located at the central line OL of the vehicle, and thus, screen correction is not required, in contrast to the case shown in FIG. 1 in which the rear-view camera 14 is positioned to the left or right side of the vehicle and in which screen correction is required.

Further, if the tail lamps 22A and 22B are installed at both sides of the rear-view camera 24, the tail lamps 22A and 22B may illuminate a license plate located at the central line OL of the vehicle without adjustment of the direction of light output from the lamps 22A and 22B.

A tail lamp may be installed at only one side of the rear-view camera 24. If the tail lamp 22A or 22B is installed at only one side of the rear-view camera 24, it is necessary to adjust the direction of output light so as to correspond to the position of the license plate.

Figure 3:
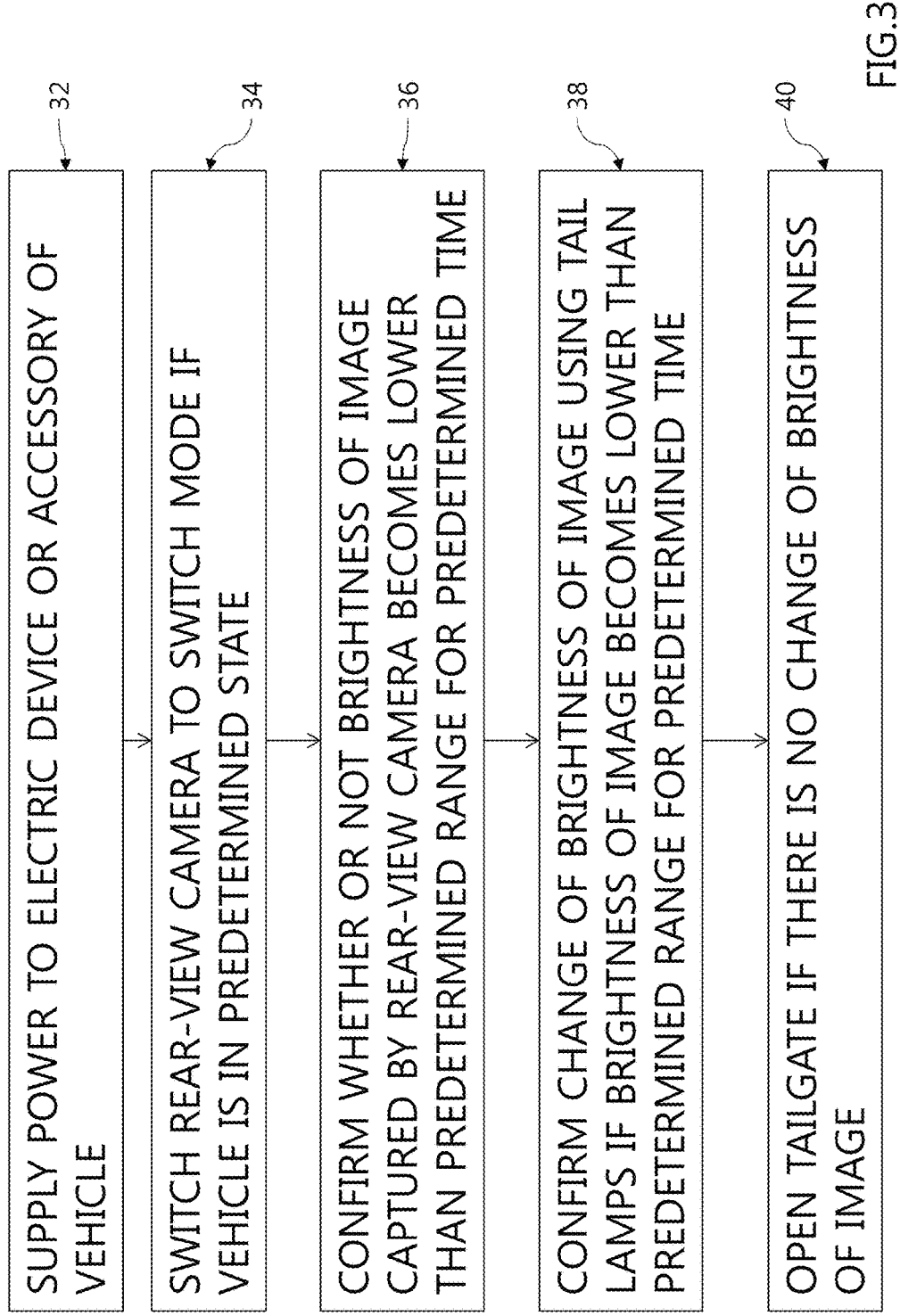
FIG. 3 is a flowchart representing a method of controlling a tailgate using a rear-view camera in a vehicle in accordance with the present invention.

FIG. 3 is a flowchart representing a method of controlling a tailgate using a rear-view camera in a vehicle in accordance with the present invention.

As exemplarily shown in FIG. 3, a method of controlling a tailgate using a rear-view camera in a vehicle in accordance with the present invention may include supplying power to an electric device or an accessory of the vehicle (step 32), switching the rear-view camera to a switch mode if the vehicle is in a predetermined state (step 34), confirming whether or not brightness of an image captured by the rear-view camera becomes lower than a predetermined range for a predetermined time (step 36), confirming change of brightness of the image using tail lamps if brightness of the image becomes lower than the predetermined range for the predetermined time (step 38), and opening a tailgate if there is no change of brightness of the image (step 40).

According to the method in accordance with the present invention, in order to open the tailgate (a trunk door) using the rear-view camera mounted on the vehicle, an image transmitted from the rear-view camera may be used. In particular, a change of brightness of the image transmitted from the rear-view camera is sensed. For example, the change of brightness of the image may be determined based on a brightness value (B) in an HSV color space or determined based on a brightness value (for example, μ) in an RGB color space.

Since opening of the tailgate is controlled using the rear-view camera of the vehicle, it is not necessary to separately mount a tailgate switch. Therefore, as described above with reference to FIG. 2, the rear-view camera may be located at the central line of the vehicle, and two tail lamps may be located at both sides of the rear-view camera.

For example, a situation in which a user (or a driver) intends to open the tailgate (the trunk door) will be assumed. Opening of the tailgate of the vehicle during driving of the vehicle may hinder safety of the user (or the driver). Therefore, in order to allow the rear-view camera of the vehicle to function as a tailgate switch, the vehicle should satisfy a designated condition or a specific state.

There may be various states to switch the rear-view camera to the switch mode. For example, if a transmission of the vehicle is in a parking (P) mode, the rear-view camera may operate as a tailgate switch. If the vehicle is parked, the rear-view camera does not need to provide information regarding the rear surface of the vehicle to the driver (or the user), and thus, switching of the rear-view camera to another purpose does not cause a vehicle safety problem.

Further, if the transmission of the vehicle is in a drive (D) mode or a neutral (N) mode, the vehicle may be driving or be stopped for a moment. If the transmission of the vehicle is in the drive (D) mode or the neutral (N) mode, the rear-view camera does not need to provide information regarding the rear surface of the vehicle to the driver (or the user). Even if the vehicle is stopped for a moment, the driver (or the user) or a passenger may open the tailgate, and thus, it may be necessary to switch the rear-view camera to the switch mode. However, since opening of the tailgate of the vehicle during driving of the vehicle may be dangerous, if the transmission of the vehicle is in the drive (D) mode or the neutral (N) mode, the rear-view camera may be switched to the switch mode only when the driving speed of the vehicle is zero.

Further, even if the transmission of the vehicle is in a reverse (R) mode, the driver (or the user) or the passenger may open the tailgate. However, if the transmission of the vehicle is in the reverse (R) mode, the rear-view camera transmits information regarding the rear surface of the vehicle to the driver (or the user). Therefore, if the transmission of the vehicle is in the reverse (R) mode, the switch mode in which change of brightness of the image output from the rear-view camera is analyzed may be operated when the driving speed of the vehicle is zero.

The above-described cases illustrate the state of the vehicle to switch the rear-view camera to the switch mode based on the position of the transmission of the vehicle. However, if a different kind of transmission is mounted in the vehicle, only the driving speed of the vehicle (for example, 0 km/h or 0 MPH) other than the position of the transmission may be set as the condition to switch the rear-view camera to the switch mode.

Further, for safety of the vehicle, the cases in which the tailgate (the trunk door) may be opened may be restricted. If the tailgate (trunk door) of the vehicle is restricted so as to be opened only during parking, the rear-view camera may be switched to the switch mode only when the transmission of the vehicle is in the parking (P) mode.

When the rear-view camera is switched to the switch mode or the switch mode of the rear-view camera is used, brightness of an image captured by the rear-view camera may be analyzed. During the analysis process of the brightness of the image transmitted from the rear-view camera, whether or not the brightness of the image becomes lower than a predetermined range for a predetermined time may be judged. Further, cases in which the brightness of the image becomes lower than the predetermined range for the predetermined time may include a case in which the brightness of the image is lowered due to an object located in front of the rear-view camera. For example, if the lens of the rear-view camera is shielded by a hand, the amount of light input to the lens of the rear-view camera may be greatly decreased and thereby the brightness of an image output from the rear-view camera may be greatly lowered.

Further, the brightness of the image output from the rear-view camera may be changed according to surrounding environmental change, such as if the sun rises or sets or if the rear-view camera is in the shade. However, the brightness of the image changed according to surrounding environmental change may be within the predetermined range. Therefore, by tracking the brightness of the image output from the rear-view camera, whether or not the lens of the rear-view camera is shielded by a user's hand (i.e., whether or not the lens of the rear-view camera is intentionally shielded by user's action) or if the brightness of the image is naturally changed according to surrounding environmental change may be confirmed.

By tracking the brightness of the image output from the rear-view camera, if it is judged that the lens of the rear-view camera is intentionally shielded by user's action, a change of brightness of the image may be confirmed using the tail lamps. Such a process is to judge whether or not the lens of the rear-view camera is intentionally shielded by user's action or is partially shielded by accidental action or due to another factor (due to entrance to an underground parking lot or by a large object). Since the tail lamps are adjacent to the rear-view camera, if the lens of the rear-view camera is not completely shielded intentionally by user's action, when the tail lamps are turned on, the brightness of the image output from the rear-view camera may be changed. On the other hand, if the lens of the rear-view camera is completely shielded intentionally by user's action, even when the tail lamps are turned on, the brightness of the image output from the rear-view camera is not changed.

If the brightness of the image output from the rear-view camera is not changed, the tailgate may be opened (Operation 40). On the other hand, if the brightness of the image output from the rear-view camera is changed, the tailgate may not be opened.

For example, if the transmission is in the parking (P) mode, the rear-view camera may be operated in the switch mode. If brightness of a screen output from the rear-view camera is suddenly lowered, it may be judged that the user shields the rear-view camera with his/her hand in order to open the tailgate (the trunk door). Thereafter, when the tail lamps for illuminating a license plate are turned on, whether or not the camera is intentionally shielded by the user may be judged. If the brightness of the screen is not changed even after the tail lamps for illuminating the license plate are turned on, it may be judged that the camera is intentionally shielded by the user and the tailgate may be opened. If the brightness of the screen is changed after the tail lamps for illuminating the license plate are turned on, the vehicle may stand by in the switch mode state.

FIGS. 4(*a*) to 4(*d*) are photographs illustrating an analysis method of an image output from the rear-view camera. In particular, FIG. 4(*a*) is a photograph of a screen output from the rear-view camera, and FIG. 4(*b*) is a photograph of a screen to analyze brightness of an image output from the rear-view camera shown in FIG. 4(*a*). Further, FIG. 4(*c*) is a photograph of a black screen which may be output when the lens of the rear-view camera is completely shielded or output at night, and FIG. 4(*d*) is a photograph of a screen when the lens of the rear-view camera is partially shielded by a user's hand.

In order to replace a switch of the tailgate with the rear-view camera, a shielded amount of the lens of the rear-view camera is judged using lamps installed around the rear-view camera or using a separate additional lamp (for example, an IR lamp, etc.). The tailgate may be opened when it is judged that the lens of the rear-view camera is intentionally shielded by the user based on the shielded amount of the lens of the rear-view camera.

For example, in the case of FIG. 4(*c*), if the lens of the rear-view camera is completely shielded, brightness of the screen output from the rear-view camera is not changed even when the tail lamps or lamps installed adjacent to the rear-view camera are turned on. In this case, the tailgate may be opened.

Figure 4B:
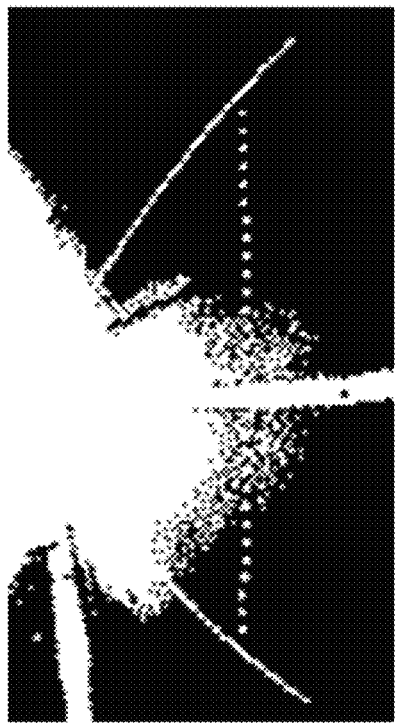
FIGS. 4(a) to 4(d) are photographs illustrating an analysis method of an image output from the rear-view camera.
Figure 4D:
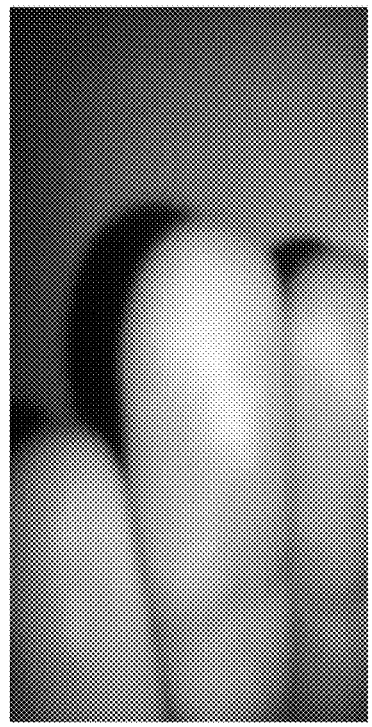
Figure 4A:
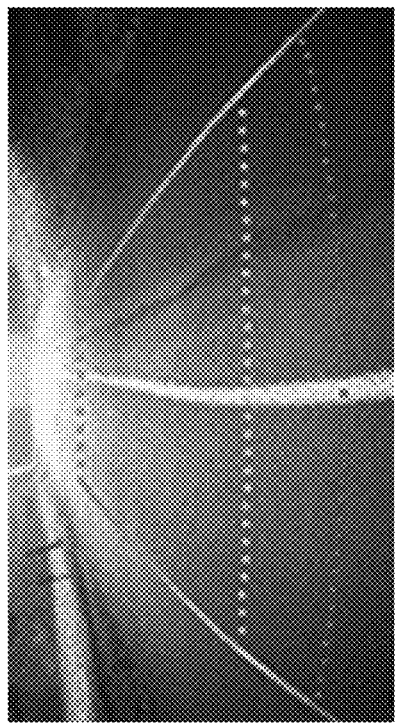
Figure 4C:
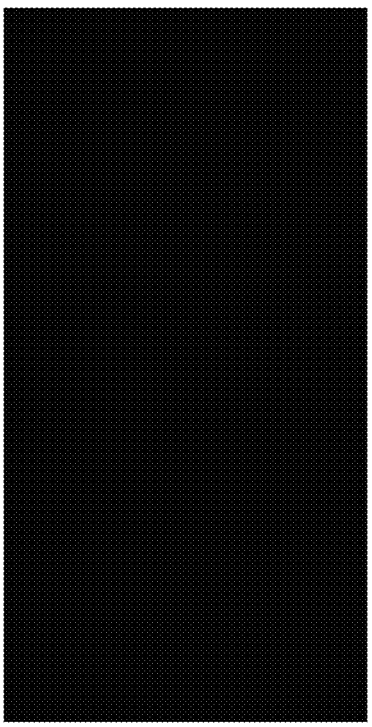

On the other hand, in the case of FIG. 4(c), if the lens of the rear-view camera is not shielded and the black screen is output from the rear-view camera at night, brightness of the screen output from the rear-view camera is changed when the tail lamps or the lamps installed adjacent to the rear-view camera are turned on. In this case, the tailgate is not opened.

In the case of FIG. 4(d), if the lens of the rear-view camera is partially shielded by a user's hand, brightness of the screen output from the rear-view camera is changed when the tail lamps or the lamps installed adjacent to the rear-view camera are turned on. In this case, the tailgate is not opened.

As described above, if the rear-view camera and the tail lamps for illuminating the license plate are located adjacent to each other and thus the rear-view camera is not completely shielded, the rear-view camera may be influenced by the tail lamps when the tail lamps are turned on. On the other hand, if the rear-view camera is completely shielded, the rear-view camera may not be influenced by the tail lamps even when the tail lamps are turned on.

Figure 5B:
FIGS. 5(a) and 5(b) are photographs illustrating another analysis method of an image output from the rear-view camera.
Figure 5A:
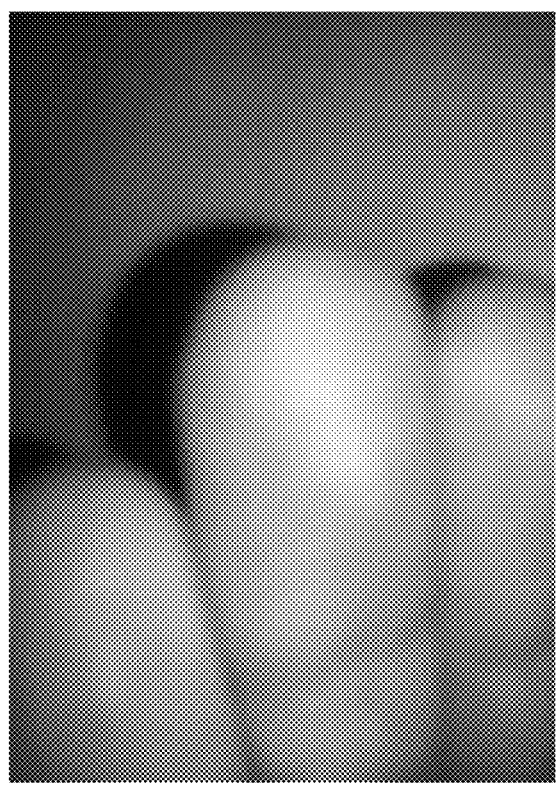

FIGS. 5(a) and 5(b) are photographs illustrating another analysis method of an image output from the rear-view camera. In particular, FIG. 5(a) is a photograph of a screen when the rear-view camera is partially shielded by a user, and FIG. 5(b) is a photograph illustrating change of the screen generated when the tail lamps are turned on if the rear-view camera is partially shielded by the user.

With reference to FIGS. 5(a) and 5(b), since the lens of the rear-view camera is not completely shielded, it may be understood that, when illumination of the license plate is changed, an image is changed. In this case, it may be judged that the user does not intend to open the tailgate (the trunk door).

Figure 6:
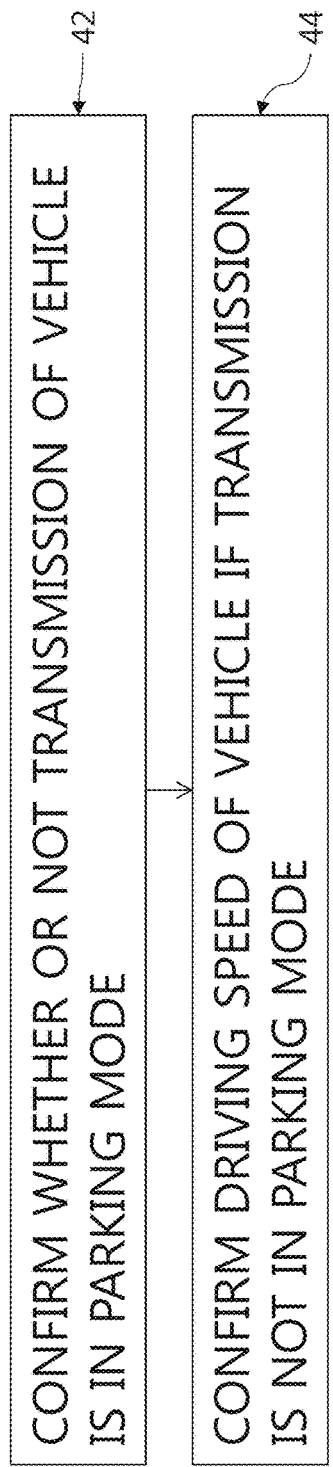
FIG. 6 is a flowchart representing a method of recognizing the state of the vehicle.

FIG. 6 is a flowchart representing a method of recognizing the state of the vehicle.

As exemplarily shown in FIG. 6, the method of recognizing the state of the vehicle may include confirming whether or not the transmission of the vehicle is in the parking mode (step 42), and confirming the driving speed of the vehicle if the transmission is not in the parking mode (Operation 44).

The state of the vehicle to switch the rear-view camera to the switch mode or to use the switch mode may be the case in which the transmission is in the parking mode or the case in which, if the transmission is not in the parking mode, the speed of the vehicle is zero.

In particular, if the transmission is in the drive (D) mode or neutral (N) mode, a rear-view camera screen (a multimedia screen, etc.) does not display a rear-view camera image. Therefore, the switch mode operation of the rear-view camera may be executed as a background. If the transmission is in the drive (D) mode or neutral (N) mode, the rear-view camera may enter the switch mode only in a state in which the rear-view camera receive speed information of the vehicle from the vehicle and thus the vehicle is stopped. Otherwise, the switch mode of the rear-view camera is continuously executed as a background and then user's intention may be detected using the lamps located adjacent to the rear-view camera.

If the transmission is in the reverse (R) mode, a user's multimedia screen is in a display state of an image output from the rear-view camera and user's intention may be detected using the lamps located adjacent to the rear-view camera.

Figure 7:
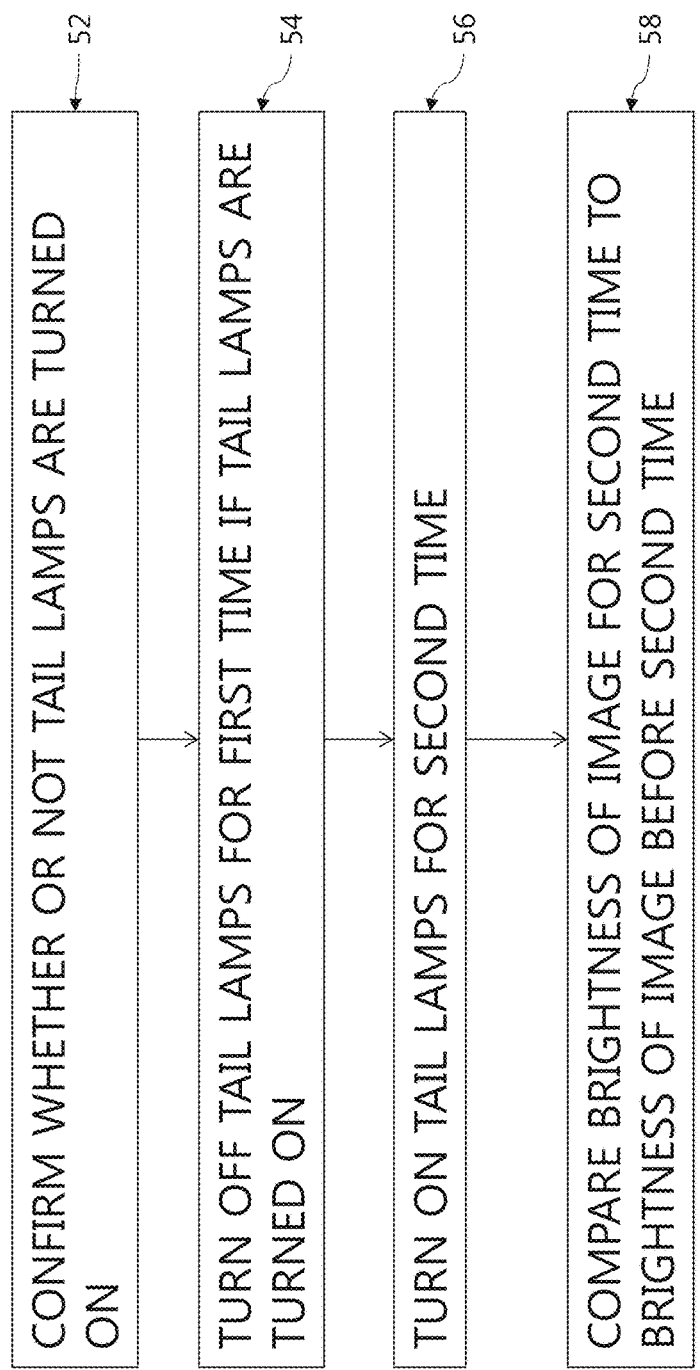
FIG. 7 is a flowchart representing a method of confirming change of brightness of an image output from the rear-view camera.

FIG. 7 is a flowchart representing a method of confirming change of brightness of an image output from the rear-view camera.

As exemplarily shown in FIG. 7, the method of confirming change of brightness of the image output from the rear-view camera may include confirming whether or not the tail lamps are turned on (step 52), turning off the tail lamps for a first time if the tail lamps are turned on (step 54), turning on the tail lamps for a second time (step 56), and comparing brightness of the image for the second time to brightness of the image before the second time (step 58).

Here, the first time may be a very short time (for example, 0.1 to 1 seconds). The first time serves as a reference to judge a shielded degree of the lens of the rear-view camera by surrounding environments and intentionally by the user regardless of operation of the tail lamps.

Further, the second time may be a time sufficient to understand user's intention through operation of the tail lamps (for example, 1 to several seconds). If the lens of the rear-view camera is continuously shielded for the second time and thus there is no change of brightness of the image output from the rear-view camera, it may be judged that a user intends to open the tailgate (the trunk door). On the other hand, if there is change of brightness of the image output from the rear-view camera for the second time, it may be judged that a user does not intend to open the tailgate (the trunk door).

Figure 8:
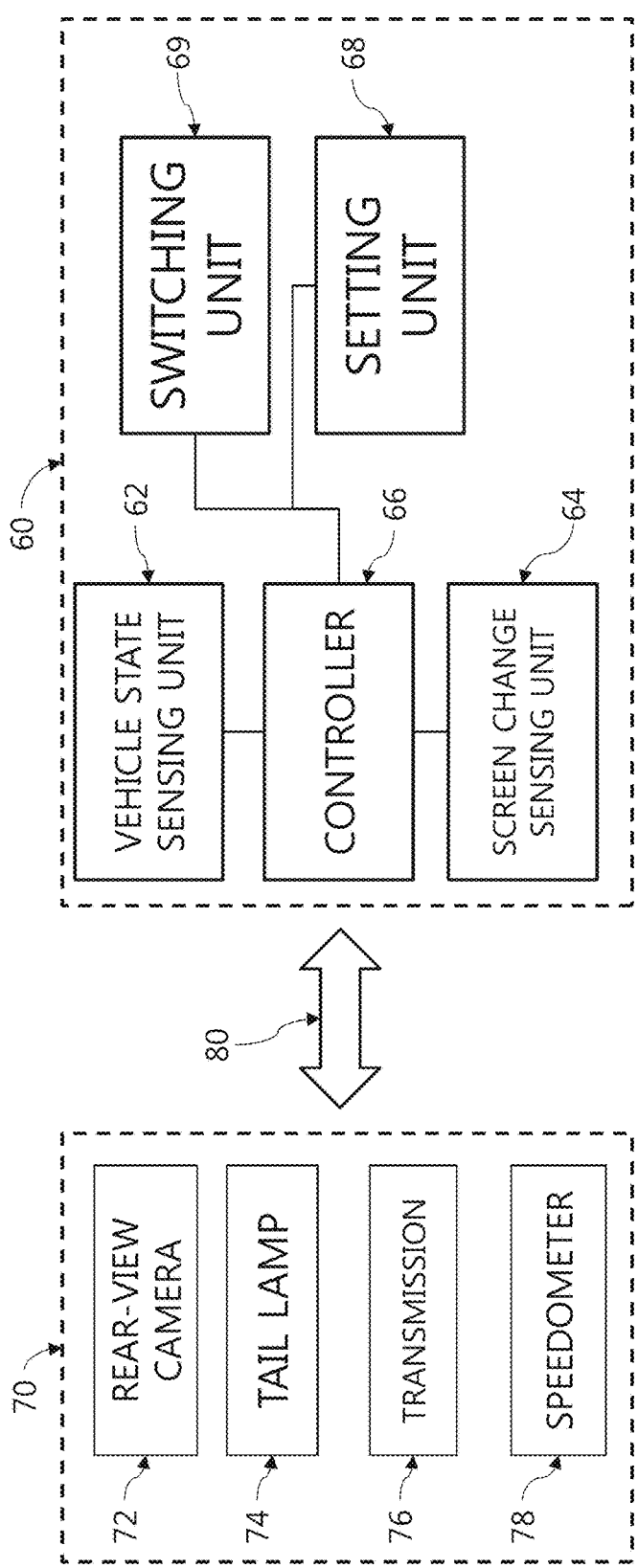
FIG. 8 is a block diagram illustrating an apparatus of controlling a tailgate using a rear-view camera in accordance with the present invention.

FIG. 8 is a block diagram illustrating an apparatus of controlling a tailgate using a rear-view camera in accordance with the present invention.

As exemplarily shown in FIG. 8, a vehicle may include a rear-view camera 72, tail lamps 74, a transmission 76, a speedometer 78, etc. as an apparatus for assisting a driver in driving of the vehicle 70. The apparatus 70 may be connected to an apparatus for controlling a tailgate 60 through an in-vehicle communication network 80.

The apparatus for controlling the tailgate 60 may include a vehicle state sensing unit 62 to judge whether or not the vehicle is in a predetermined state, a setting unit 68 to switch the rear-view camera 72 to a switch mode according to a result of judgment by the vehicle state sensing unit 62, a screen change sensing unit 64 to sense change of brightness of an image captured by the rear-view camera 72, a controller 66 to confirm whether or not brightness of the image becomes lower than a predetermined range for a predetermined time and to confirm change of brightness of the image using the tail lamps 74 if the brightness of the image becomes lower than the predetermined range for the predetermined time, and a switching unit 69 to generate a tailgate opening signal corresponding to output from the controller 66.

For example, with reference to FIGS. 2 and 8, the rear-view camera 72 may output an image acquired by photographing the rear surface of the vehicle and be located at the central line of the vehicle. Further, the tail lamps 74 may illuminate a license plate of the vehicle and be located at both sides or one side of the rear-view camera 72.

The vehicle state sensing unit 62 may confirm whether or not the transmission of the vehicle is in the parking mode, and confirm the driving speed of the vehicle if the transmission is not in the parking mode. The predetermined state of the vehicle to switch the rear-view camera to the switch mode or to operate the rear-view camera in the switch mode may include the case in which the transmission is in the parking mode or the case in which, if the transmission is not in the parking mode, the speed of the vehicle is zero.

Brightness of the image output from the rear-view camera 72 may be sensed by the screen change sensing unit 64, and cases in which brightness of the image becomes lower than the predetermined range for the predetermined time may include a case in which the brightness of the image is lowered due to an object located in front of the rear-view camera 72.

Further, the controller 66 may confirm whether or not the tail lamps 74 are turned on through the vehicle state sensing unit 62 and turn off the tail lamps 74 for a first time if the tail lamps 74 are turned on. Thereafter, the controller 66 may turn on the tail lamps 74 for a second time and compare a brightness of the image for the second time to a brightness of the image before the second time, transmitted through the screen change sensing unit 64.

Further, the controller 66, if it is judged that there is change of brightness of the image, may control the switch unit 69 not to output the tailgate opening signal.

For example, the screen change sensing unit 64 may judge a change of brightness of the image based on a brightness value (B) in an HSV color space or based on a brightness value (for example, p) in an RGB color space.

The method in accordance with the above-described embodiment may be implemented as a computer executable program and stored in a computer readable recording medium. The computer readable recording medium may be one of a ROM, a RAM, a CD-ROM, a magnetic tape, a floppy disk, an optical data storage device, etc. Further, the computer readable recording medium may be realized in the form of a carrier wave (for example, transmission over the Internet).

The computer readable recording medium may be distributed to computer systems connected by a network and be stored and executed as code which is readable by computers in a distributed manner. Further, functional programs, code and code segments to implement the above-described method may be easily deduced by programmers in the art to which the embodiment pertains.

As apparent from the above description, an apparatus of controlling a tailgate using a rear-view camera in a vehicle in accordance with an embodiment of the present invention has effects, as follows.

The apparatus of the present invention may replace a tailgate switch with the rear-view camera having the function of the tailgate switch, thereby reducing manufacturing costs of the vehicle.

Further, since the rear-view camera having the function of the tailgate switch is located at the center of the vehicle, it may be easy to design the mounting position of the rear-view camera on the vehicle and screen correction or tuning/adjustment caused by positioning of the rear-view camera to one side may be omitted, thus improving performance of the rear-view camera.

It will be apparent to those skilled in the art that various modifications and variations can be made in the present invention without departing from the spirit or scope of the invention.

Thus, it is intended that the present invention cover the modifications and variations of this invention provided they come within the scope of the appended claims and their equivalents.

What is claimed is:

1. A method of controlling a tailgate using a rear-view camera in a vehicle, comprising:
   supplying power to an electric device or an accessory of the vehicle;
   switching the rear-view camera to a switch mode if the vehicle is in a predetermined state;
   confirming whether or not brightness of an image captured by the rear-view camera becomes lower than a predetermined range for a predetermined time;
   confirming a change of brightness of the image using at least one tail lamp or another lamp installed adjacent to the rear-view camera if the brightness of the image becomes lower than the predetermined range for the predetermined time; and
   opening the tailgate if there is no change of brightness of the image.

2. The method according to claim 1, further comprising:
   confirming whether or not a transmission of the vehicle is in a parking mode; and
   confirming a driving speed of the vehicle if the transmission is not in the parking mode.

3. The method according to claim 2, wherein the predetermined state includes:
   a case in which the transmission is in the parking mode; or
   a case in which, if the transmission is not in the parking mode, the speed of the vehicle is zero.

4. The method according to claim 1, wherein a state in which the brightness of the image becomes lower than the predetermined range for the predetermined time includes a case in which the brightness of the image is lowered due to an object located in front of the rear-view camera.

5. The method according to claim 1, wherein the step of confirming the change of brightness of the image includes:
   confirming whether or not the at least one tail lamp or another lamp installed adjacent to the rear-view camera are turned on;
   turning off the at least one tail lamp or another lamp installed adjacent to the rear-view camera for a first time if the tail lamps are turned on;
   turning on the at least one tail lamp or another lamp installed adjacent to the rear-view camera for a second time; and
   comparing a brightness of the image for the second time to a brightness of the image before the second time.

6. The method according to claim 1, further comprising, if it is confirmed that there is the change of brightness of the image, closing the tailgate.

7. The method according to claim 1, wherein the change of brightness of the image is judged based on a brightness value (B) in an HSV color space or judged based on a brightness value ($\mu$) in an RGB color space.

8. The method according to claim 1, wherein the rear-view camera is located at the center of the vehicle.

9. The method according to claim 1, wherein the rear-view camera is located between two tail lamps.

10. An apparatus for controlling a tailgate using a rear-view camera in a vehicle comprising a processing system that comprises at least one data processor and at least one computer-readable memory storing a computer program, wherein the processing system is configured to cause the apparatus to:
   supply power to an electric device or an accessory of a vehicle;
   switch a rear-view camera to a switch mode if the vehicle is in a predetermined state;
   confirm whether or not brightness of an image captured by the rear-view camera becomes lower than a predetermined range for a predetermined time;
   confirm a change of brightness of the image using at least one tail lamp or another lamp installed adjacent to the rear-view camera if the brightness of the image becomes lower than the predetermined range for the predetermined time; and open a tailgate if there is no change of brightness of the image.

11. The apparatus according to claim 10, wherein the processing system is further configured to cause the apparatus to:

confirm whether or not a transmission of the vehicle is in a parking mode; and confirm a driving speed of the vehicle if the transmission is not in the parking mode.

12. An apparatus for controlling a tailgate using a rear-view camera in a vehicle, comprising:

a vehicle state sensing unit configured to judge whether or not the vehicle is in a predetermined state;

a screen change sensing unit configured to sense change of brightness of an image captured by the rear-view camera; and a controller configured to:

switch the rear-view camera to a switch mode according to a result of judgement by the vehicle state sensing unit;

confirm whether or not brightness of the image becomes lower than a predetermined range for a predetermined time and to confirm a change of brightness of the image using at least one tail lamp or another lamp installed adjacent to the rear-view camera if the brightness of the image becomes lower than the predetermined range for the predetermined time; and generate a tailgate opening signal corresponding to output from the controller.

13. The apparatus according to claim 12, wherein the rear-view camera outputs an image acquired by photographing the rear surface of the vehicle and is located at the center of the vehicle.

14. The apparatus according to claim 12, wherein the at least one tail lamp or another lamp installed adjacent to the rear-view camera illuminate a license plate of the vehicle and are located at both sides of the rear-view camera.

15. The apparatus according to claim 12, wherein the vehicle state sensing unit:

confirms whether or not a transmission of the vehicle is in a parking mode; and confirms a driving speed of the vehicle if the transmission is not in the parking mode.

16. The apparatus according to claim 15, wherein the predetermined state includes:

a case in which the transmission is in the parking mode; or a case in which, if the transmission is not in the parking mode, the speed of the vehicle is zero.

17. The apparatus according to claim 12, wherein a state in which the brightness of the image becomes lower than the predetermined range for the predetermined time includes a case in which the brightness of the image is lowered due to an object located in front of the rear-view camera.

18. The apparatus according to claim 12, wherein the controller:

confirms whether or not the at least one tail lamp or another lamp installed adjacent to the rear-view camera are turned on through the vehicle state sensing unit, and turns off the at least one tail lamp or another lamp installed adjacent to the rear-view camera for a first time if the tail lamps are turned on; and turns on the at least one tail lamp or another lamp installed adjacent to the rear-view camera for a second time, and compares a brightness of the image for the second time to a brightness of the image before the second time, transmitted through the screen change sensing unit.

19. The apparatus according to claim 12, wherein, if it is confirmed that there is the change of brightness of the image, the controller controls the switch unit not to output the tailgate opening signal.

20. The apparatus according to claim 12, wherein the screen change sensing unit judges the change of brightness of the image based on a brightness value (B) in an HSV color space or based on a brightness value ($\mu$) in an RGB color space.

* * * * *